(12) United States Patent
Voong et al.

(10) Patent No.: US 7,467,724 B2
(45) Date of Patent: Dec. 23, 2008

(54) LOCKING ARRANGEMENT FOR A BEARING ASSEMBLY OF A MALE CONNECTION MEMBER FOR AN ARTICULATED COUPLING APPARATUS

(75) Inventors: Gary Voong, Chicago, IL (US); Scott Natschke, Kankakee, IL (US); Howard Sommerfeld, Oak Forest, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 419 days.

(21) Appl. No.: 11/249,974

(22) Filed: Oct. 13, 2005

(65) Prior Publication Data

US 2007/0084817 A1 Apr. 19, 2007

(51) Int. Cl.
*B61G 5/00* (2006.01)
(52) U.S. Cl. ........................................ 213/75 R; 105/3
(58) Field of Classification Search ................ 213/50, 213/62 R, 74, 75 R; 105/3; 384/202, 203
See application file for complete search history.

(56) References Cited

U.S. PATENT DOCUMENTS

| | | | | |
|---|---|---|---|---|
| 3,581,363 A | * | 6/1971 | Roesner et al. ............. | 384/202 |
| 3,695,650 A | * | 10/1972 | Stuck ........................ | 384/202 |
| 5,042,393 A | * | 8/1991 | Kanjo et al. ................ | 105/3 |
| 5,065,679 A | * | 11/1991 | Wallace et al. ............. | 105/3 |
| 5,080,243 A | * | 1/1992 | Lynch et al. ............... | 213/75 R |
| 5,131,331 A | * | 7/1992 | Lynch et al. ............... | 105/3 |
| 5,167,334 A | * | 12/1992 | Kanjo et al. ............... | 213/75 R |
| 5,219,082 A | * | 6/1993 | Daugherty et al. ......... | 213/75 R |
| 6,176,379 B1 | * | 1/2001 | Daugherty, Jr. ............ | 213/75 R |
| 6,237,785 B1 | * | 5/2001 | Daugherty, Jr. ............ | 213/62 R |
| 6,564,956 B2 | * | 5/2003 | Daugherty, Jr. ............ | 213/75 R |
| 6,688,482 B1 | * | 2/2004 | Daugherty, Jr. ............ | 213/75 R |
| 6,691,883 B1 | * | 2/2004 | Daugherty, Jr. ............ | 213/75 R |

OTHER PUBLICATIONS

PCT/US2006/039728, Notification of Transmittal of the International Preliminary Report on Patentability, Date of Completion Sep. 11, 2007.
PCT/US2006/039728, Notification of Transmittal of the International Preliminary Report on Patentability, Date of Completion Oct. 18, 2007.

* cited by examiner

*Primary Examiner*—Lars A Olson
(74) *Attorney, Agent, or Firm*—James Ray & Assoc.

(57) ABSTRACT

A locking arrangement for securing a bearing assembly to a male connection member of an articulated coupling apparatus includes an aperture having an outwardly extending beveled portion formed at each end thereof. A race assembly of the bearing assembly has a beveled portion abuttingly engaging a first beveled portion of the aperture and has an inwardly extending recessed portion and a ledge portion disposed adjacent the second beveled portion. The ledge portion at least partially closes the recessed portion and has an inner surface extending from the recessed portion towards the aperture at a predetermined angle. A locking member is disposed in a groove formed by such second beveled portion, the recessed portion and the inner surface of the ledge portion for securing the race assembly within the aperture in combination with the opposed beveled portion formed in the race assembly.

20 Claims, 2 Drawing Sheets

LOCKING ARRANGEMENT FOR A BEARING ASSEMBLY OF A MALE CONNECTION MEMBER FOR AN ARTICULATED COUPLING APPARATUS

FIELD OF THE INVENTION

This invention relates, in general, to articulated coupling arrangements used to connect adjacent ends of a pair of railway cars together in a substantially semi-permanent fashion and, more particularly, this invention relates to a locking arrangement for securing a bearing assembly within a male connection member.

BACKGROUND OF THE INVENTION

The following background information is provided to assist the reader in understanding the environment in which the invention will typically be used. The terms used herein are not intended to be limited to any particular narrow interpretation unless specifically stated otherwise in this document.

Articulated coupling arrangements are well known in the railroad industry for connecting together adjacently disposed ends of a pair of railway cars.

One type of prior art articulated coupling device is taught in U.S. Pat. No. 5,219,082 to Daugherty et al owned by the assignee of the present invention. The teachings of U.S. Pat. No. 5,219,082 are incorporated herein by reference thereto.

Such articulated coupling arrangement provides a male connection member which can be retrofitted into existing railway cars and is capable of connecting them together in conjunction with a female connection member in a substantially semi-permanent fashion. Such male connection member includes a first end portion having a predetermined configuration enabling engagement and connection thereof to a predetermined end of a center sill member disposed substantially along a longitudinal centerline of a railway car to be connected.

The male connection member has a second end portion formed integrally with such first end portion and disposed substantially axially opposite such first end portion. Such second end portion includes an outer end surface having a predetermined configuration ensuring that no contact will be made between the outer end surface and other components of such articulated type coupling arrangement.

An aperture, having a predetermined size and a predetermined shape, is formed through a predetermined portion of such second end portion of the male connection member. A longitudinal axis of this aperture is disposed transverse to a longitudinal axis of such male connection member. Additionally, this longitudinal axis of such aperture is disposed in a substantially horizontal plane during operation.

A bearing assembly including a spherical member positioned within a race assembly formed by a pair of races is pressed into such aperture and secured by welding such pair of raceways to such second end portion or by utilizing at least one separate retaining member, fastened to the second end with a plurality of fasteners, to cage the bearing assembly the aperture.

The welding method has been preferred due to its manufacturing cost advantages, however, the heat generated during such welding process is undesirable for maintaining structural integrity of such male connection member which is typically produced by a casting process.

The at least one separate retaining member, fastened to the second end with a plurality of fasteners, eliminates undesirable effect of the heat generated during the welding process but would not withstand applied forces in all applications.

Therefore, it is desirable to provide an economical locking arrangement for securing the bearing assembly in the male connection member which eliminates the disadvantages of applying heat to such male connection member during welding or utilizing a fastened retaining member.

As is well known, the articulated coupling arrangement must be periodically reconditioned. Such reconditioning is generally carried out by replacing the bearing races due to deterioration of their surfaces during railway car service. Presently, such replacement necessitates removal of the existing welds, usually by grinding, and application of new welds after insertion of the new bearing assembly which is undesirable as discussed above.

SUMMARY OF THE INVENTION

The present invention provides a locking arrangement for securing a bearing assembly of a male connection member of an articulated coupling apparatus used for connecting together, in a substantially semi-permanent manner, adjacent ends of a pair of railway cars. The male connection member includes a first end portion for attachment to a center sill member of a railway car and a second end portion formed integrally with the first end portion and axially extending therefrom. The second end portion has an aperture with a longitudinal axis disposed transverse to a longitudinal axis of the male connection member. A bearing assembly including a spherical member disposed within a race assembly is pressed into the aperture. In a first embodiment, such locking arrangement includes such aperture having an outwardly extending beveled portion formed at each end thereof. A race assembly of the bearing assembly has a beveled portion abuttingly engaging a first beveled portion of the aperture and has an inwardly extending recessed portion and a ledge portion disposed adjacent the second beveled portion. The ledge portion at least partially closes the recessed portion and has an inner surface extending from the recessed portion towards the aperture at a predetermined angle. A locking member is disposed in a groove formed by such second beveled portion, the recessed portion and the inner surface of the ledge portion for securing the race assembly within the aperture in combination with the opposed beveled portion formed in the race assembly.

In a second embodiment, a groove is formed at each end of the aperture and the race assembly is secured with a pair of locking members.

In another embodiment, a recessed portion is formed at one end of the aperture and outwardly extending therefrom and the race assembly includes a complimentary ledge portion in abutting engagement with the recessed portion. The groove and the locking member are used at the second end of the aperture and the race assembly to secure the bearing assembly to the second end of the male connection member.

OBJECTS OF THE INVENTION

It is, therefore, one of the primary objects of the present invention to provide an articulated coupling arrangement which can accommodate a bearing assembly disposed substantially along a horizontal axis of a male connection member.

Another object of the present invention is to provide a locking arrangement for securing the bearing assembly within the male connection member.

Yet another object of the present invention is to provide a locking arrangement for securing the bearing assembly within the male connection member without applying heat.

A further object of the present invention is to provide a locking arrangement for securing the bearing assembly within the male connection member which is relatively inexpensive to manufacture.

Yet a further object of the present invention to provide a locking arrangement for securing the bearing assembly within the male connection member which enables ease of replacing bearing races during reconditioning of the articulated coupling arrangement.

An additional object of the present invention is to provide a locking arrangement for securing the bearing assembly within the male connection member which does not require use of special tools during installation and removal.

In addition to the above-described objects and advantages of the male connection member utilized in an articulated type coupling arrangement, various other objects and advantages of the present invention will become more readily apparent to those persons who are skilled in the railroad coupling art from the following more detailed description of the invention, particularly, when such description is taken in conjunction with the attached drawing figures and with the appended claims.

DETAILED DESCRIPTION OF VARIOUS EMBODIMENTS OF THE INVENTION

Figure 1:
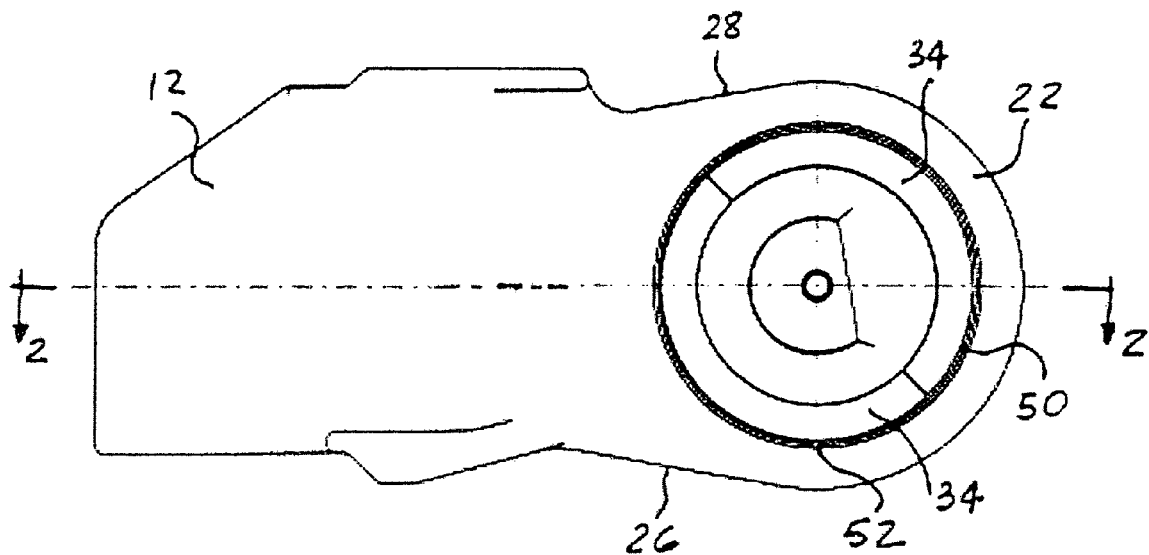
FIG. 1 is a side elevation view, which illustrates a male connection member of the present invention for use in an articulated type coupling apparatus and having a bearing assembly secured thereto.

Prior to proceeding with the more detailed description of the invention it should be noted that for the sake of clarity and understanding the invention, identical components which have identical functions have been identified with identical reference numerals throughout the several views illustrated in the attached drawing Figures.

Figure 2:
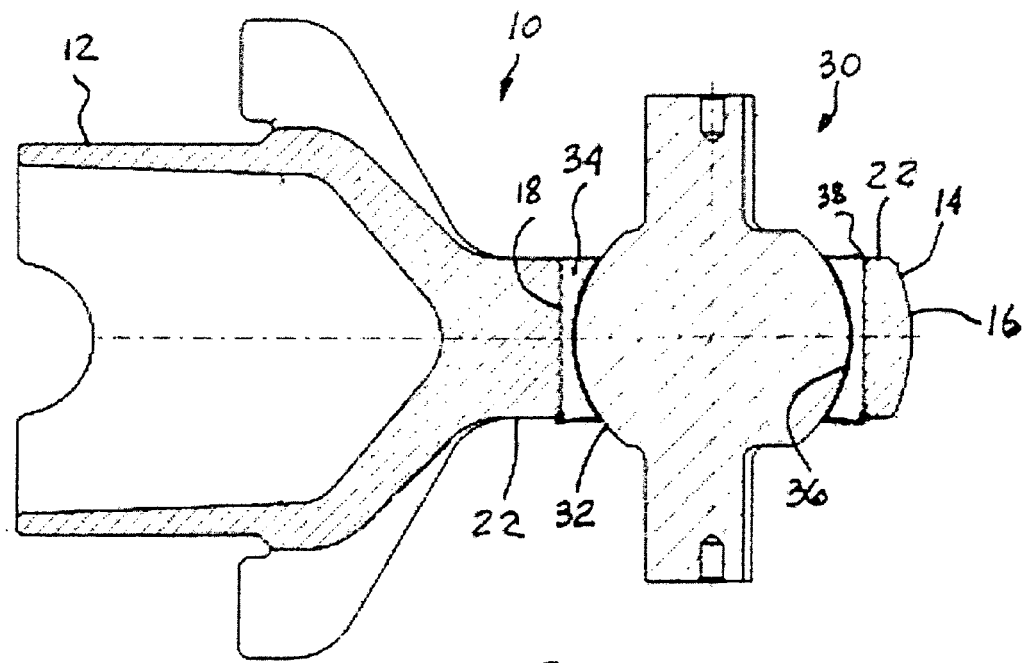
FIG. 2 is a cross-sectional view of the male connection member along lines 2-2 of FIG. 1.

Referring now to FIGS. 1 and 2, a male connection member, generally designated 10, of a presently preferred embodiment includes a first end portion 12 having a predetermined configuration. Such predetermined configuration of such first end portion 12 enables the male connection member 10 to be engaged with and connected to a predetermined end (not shown) of a center sill member (not shown) disposed substantially along a longitudinal centerline of a railway car (not shown) to be connected in a substantially semi-permanent fashion.

Additionally, the male connection member 10 includes a second end portion 14 having a predetermined size and a predetermined shape. Such second end portion 14 is preferably formed integrally with the first end portion 12 and disposed substantially axially opposite such first end portion 12.

The predetermined configuration of the second end portion 14 preferably includes a tapered portion of a bottom wall surface 26 which extends upwardly from the outermost end 16 thereof and inwardly towards the first end portion 12. This configuration also includes a tapered portion of a top wall surface 28 which extends downwardly from such outermost end 16 towards the first end portion 12 of the male connection member 10. Further, a pair of side wall portions 22 of the second end portion 14 are substantially parallel to one another.

An aperture 18 is formed through a predetermined portion of such second end portion 14 of male connection member 10 in open communication with such pair of side wall portions 22. Such aperture 18 has a predetermined size and a predetermined shape. A longitudinal axis of aperture 18 is disposed transverse to a longitudinal axis of such male connection member 10. Further, such longitudinal axis of aperture 18 is positioned in a substantially horizontal plane, as best shown in FIG. 1. In the presently preferred embodiment, each end of the aperture 18 includes a beveled portion 20 formed at an angle of about 45 degrees and extending outwardly from aperture 18, as best shown in FIG. 3.

Preferably, the first end portion 12 and the second end portion 14 of the male connection member 10 will be formed integrally as a simple piece casting. For the purposes of economy in manufacturing, such aperture 18 will be cast into the second end portion 14 at the same time. In most instances, it will be preferred for such aperture 18 to be cast as a substantially round opening even though other shapes are within the scope of the invention.

In further reference to FIGS. 1 and 2, it can be seen that a bearing assembly, generally designated 30, includes a substantially spherical member 32. At least a portion of the spherical member 32 is disposed within a race assembly 34 which is rigidly disposed within the aperture 18. An outer surface of race assembly 34 is substantially identical in size and shape as an inner surface of the aperture 18. A liner 36, formed from a material having a low coefficient of friction, may be provided intermediate an outer surface of the substantially spherical member 32 and an inner surface of the race assembly 34. Preferably, the race assembly 34 is formed as a two piece race assembly 34 best shown in FIG. 1. Alternatively, such race assembly may be formed as a one piece race assembly integrally formed onto the substantially spherical member 32 as taught in U.S. Pat. No. 6,176,379, to Daugherty and owned by the assignee of the present invention. The teachings of U.S. Pat. No. 6,176,379 are incorporated herein by reference thereto.

Figure 3:
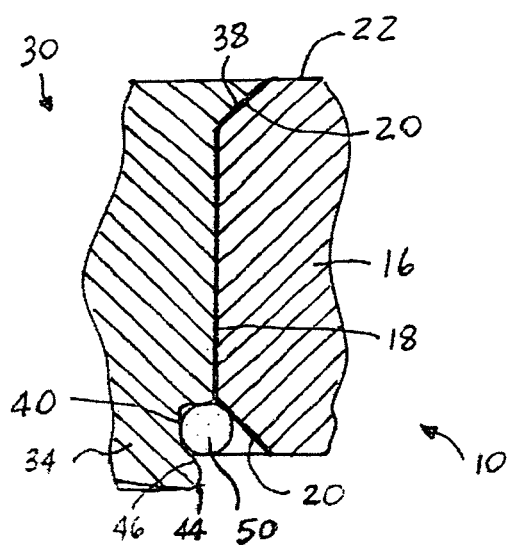
FIG. 3 is a partial cross-sectional view which illustrates a presently preferred locking arrangement for securing the bearing assembly to such male connection member.

At one end, as best shown in FIG. 3, the race assembly 34 is provided with an outwardly extending beveled portion 38 abuttingly engaging a first beveled portion 20 of aperture 18. At the distal end, as best shown in FIG. 3, the race assembly 34 is provided with a recessed portion 40, having a predetermined shape, formed in the outer surface of the race assembly 34 and disposed adjacent a second beveled portion 20 of the bearing aperture 18. A ledge 44 of the distal end of race assembly 34 at least partially closes an open end of such recessed portion 40 and has an inner surface 46 extending from recessed portion 40 towards the bearing aperture 18 at an angle of about 45 degrees.

It will be understood that a groove of such male connection member 10 formed by the combination of such second beveled portion 20, the recessed portion 40 and the inner surface 46 is presently used for depositing a weld metal to secure the bearing assembly 30 within the bearing aperture 18.

In further reference to FIG. 3, the presently preferred embodiment of the locking arrangement for securing the bearing assembly 30 within aperture 18 includes in combination such outwardly extending beveled portion 38 abuttingly mating with the first beveled portion 20 of aperture 18 and a retainer 50 disposed in such groove formed by the combination of such second beveled portion 20, the recessed portion 40 and the inner surface 46. A cross section of such retainer 50 is predetermined based on a size of a gap formed between the second beveled portion 20 and the inner surface 46 of the ledge 44, in view of the size of the recessed portion 40 and further in view of their corresponding manufacturing tolerances. Advantageously, the retainer 50 is allowed to move axially within the grove in order to accommodate such manufacturing tolerances but prevented by inner surface 46 of the ledge 44 from substantially disengaging such groove. A push out force applied to such substantially spherical member 32 along the longitudinal axis thereof moves the inner surface 46 of the ledge 44 into engagement with the retainer 50 which terminates any additional movement of the race assembly 34 and secures the bearing assembly 30 in aperture 18.

Each of the presently preferred cross sections and shapes of such retainer 50 is round. The retainer 50 is provided with a gap 52 having a predetermined width, best shown in FIG. 1, to facilitate installation and removal of such retainer 50 without a need for special tools. The presently preferred material of the retainer 50 is metal. Preferably, such metal is carbon steel. Alternatively, such retainer 50 may be manufactured from plastic, elastomer or any combination thereof.

During installation, after the bearing assembly 30 is pressed into aperture 18, the retainer 50 is slightly opened at the gap 52 and fitted into the groove formed by the combination of such second beveled portion 20, the recessed portion 40 and the inner surface 46.

During reconditioning of the existing male connection member 10, the weld is removed by grinding to restore the shape of the recessed portion 40 and the inner surface 46 and enable removal of the existing bearing assembly 30. The retainer 50 is installed after installation of a new or reconditioned bearing assembly 30.

To remove the retainer 50 of the presently preferred embodiment, a simple tool, such as a flat end screwdriver, is used to force such retainer 50 out from engagement with the groove by inserting such flat end of the screwdriver between the retainer 50 and the ledge 44 or between the retainer 50 and the beveled portion 20.

Figure 4:
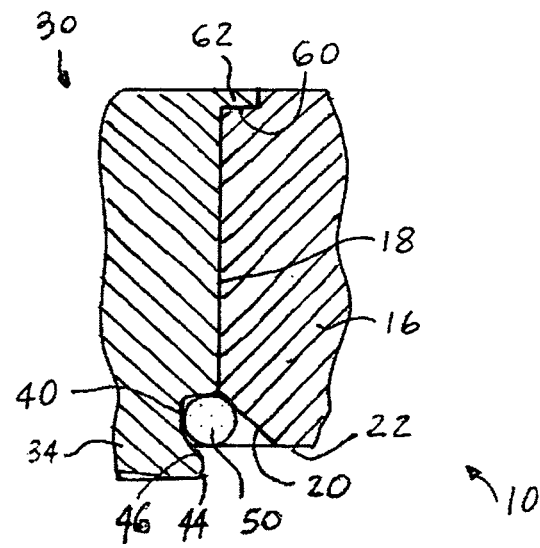
FIG. 4 is a partial cross-sectional view which illustrates an alternative locking arrangement for securing the bearing assembly to such male connection member.

FIG. 4 illustrates an alternative embodiment of the locking arrangement wherein the aperture 18 is provided with a beveled portion 20 formed in aperture 18 adjacent one end thereof and extending outwardly from aperture 18, and a recessed portion 60 formed in aperture 18 adjacent an opposed end thereof and extending outwardly therefrom.

A groove is formed in the second end portion 14 of the male connection member 10 by a combination of the beveled portion 20 formed in the bearing aperture 18, an inwardly extending recessed portion 40 having a predetermined shape formed on the outer surface of the race assembly 34 adjacent the beveled portion 20 formed in aperture 18 and a first ledge portion 44 formed in race assembly 34 adjacent the recessed portion 40. The first ledge portion 44 at least partially closes the recessed portion 40 and has an inner surface 46 extending from such recessed portion 40 towards aperture 18 at an angle of about 45 degrees. A retainer 50, having each of a predetermined cross section and predetermined shape, is at least partially disposed within the groove for preventing movement of the bearing assembly 30 in a first direction.

A second ledge portion 62, formed on an outer surface of the race assembly 30, extends outwardly from the outer surface and abuttingly engages the recessed portion 60 formed in the aperture 18 for preventing movement of the bearing assembly 30 in a second direction. Such second ledge portion 62 in combination with the retainer 50 cages the race assembly 34 of the bearing assembly 30 within the aperture 18.

Figure 5:
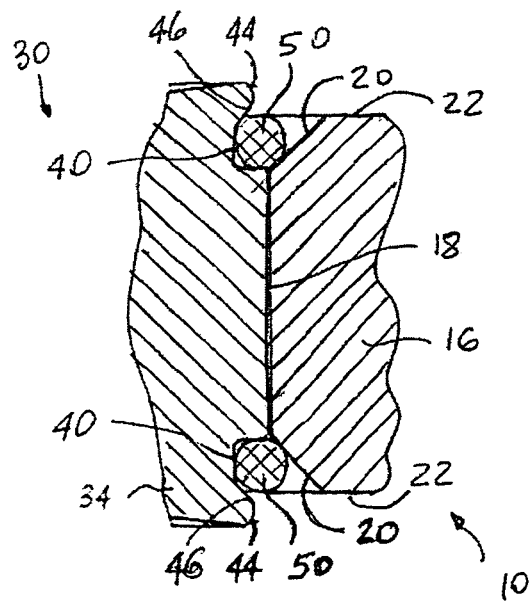
FIG. 5 is a partial cross-sectional view which illustrates another alternative locking arrangement for securing the bearing assembly to such male connection member.

FIG. 5 illustrates another alternative embodiment of the locking arrangement wherein the aperture 18 is provided with a pair of beveled portions 20, each formed adjacent a respective end of aperture 18 and extending outwardly therefrom. Accordingly, the second end 14 of the male connection member 10 is provided with a pair of grooves each formed at a respective end of aperture 18 and race assembly 34. Each groove at least partially receives a retainer 50, having a predetermined cross section and a predetermined shape, for caging race assembly 34 within aperture 18 and for preventing movement of the bearing assembly 30 along the longitudinal axis of the aperture 18.

Figure 6:
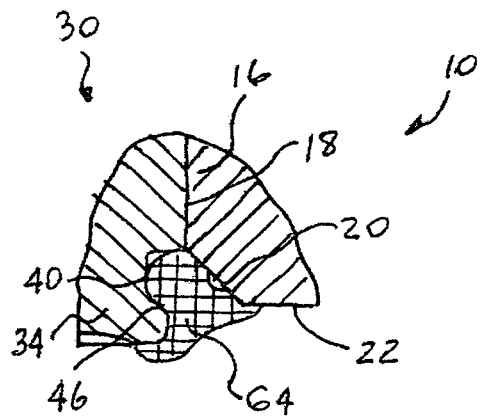
FIG. 6 is a partial cross-sectional view which illustrates still another alternative locking arrangement for securing the bearing assembly to such male connection member.

FIG. 6 illustrates another alternative embodiment of the locking arrangement wherein the retainer 64 is preferably manufactured from an elastomer substantially covering the groove formed by the combination of such beveled portion 20, the recessed portion 40 and the inner surface 46 and has a portion encasing the ledge 44. Another portion (not shown) of such retainer 64 may be formed from a metallic material to increase resistance to the push out force applied along the longitudinal axis of aperture 18.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A male connection member for use in an articulated type coupling arrangement retrofitable to existing railway cars for connecting together, in a substantially semi-permanent manner, adjacent ends of a pair of railway cars, said male connection member comprising:

(a) a first end portion having a predetermined configuration which enables said male connection member to be engaged with and connected to a predetermined end of a center sill member disposed substantially along a longitudinal center line of a railway car to be connected;

(b) a second end portion, having a predetermined size and predetermined configuration, formed integrally with said first end portion and disposed axially opposite thereof, said second end portion of said male connection member including:

(i) a top wall surface, an end wall surface and a bottom wall surface interconnected to form a continuous outer surface having a predetermined configuration which ensures noncontact with any other component when said male connection member is positioned in its operative position in such articulated type coupling arrangement;

(ii) an aperture, having a predetermined size and a predetermined shape, formed through a predetermined portion of said second end portion of said male connection member, said aperture having a longitudinal axis disposed substantially in a horizontal plane and transverse to a longitudinal axis of said male connection member; and (iii) said bottom wall surface extending upwardly from a lowest portion of the bottom wall surface and inwardly from said lowest portion towards said first end portion;

(c) a bearing assembly disposed within said aperture, said bearing assembly including:

(i) a race member having an outer surface disposed in said aperture, and (ii) a substantially spherical member rotatably mounted within an inner surface of said race member;

(d) a first means formed within and engageable with one of said bearing assembly, said aperture and a combination thereof for removably securing said bearing assembly to said second end portion of said male connection member, said first means including:

(i) a beveled portion formed in said aperture adjacent a first end thereof and extending outwardly from said aperture, (ii) a groove formed in said second end portion of said male connection member by a combination of said beveled portion formed in said aperture, an inwardly extending recessed portion having a predetermined shape and formed on said outer surface of said race member adjacent said beveled portion formed in said aperture and an inner surface of a ledge portion formed in said race member adjacent said recessed portion, said ledge portion at least partially closing said recessed portion and said inner surface extends from said recessed portion towards said aperture at a predetermined angle, and (iii) a locking member having each of a predetermined cross section and predetermined shape and disposed within said groove; and (e) a second means formed within and engageable with said one of said bearing assembly, said aperture and said combination thereof for removably securing said bearing assembly to said second end portion of said male connection member.

2. The male connection member, according to claim 1, wherein said first end portion and said second end portion of said male connection member are formed integrally as a single piece casting.

3. The male connection member, according to claim 2, wherein said aperture is cast into said single piece casting.

4. The male connection member, according to claim 1, wherein said predetermined shape of said aperture is substantially round.

5. The male connection member, according to claim 1, wherein said race member is formed as one of a single piece and a two piece member.

6. The male connection member, according to claim 1, wherein said second means for securing said bearing assembly to said second end portion of said male connection member includes:

(a) a second beveled portion formed in said aperture adjacent a second end thereof and extending outwardly from said aperture; and (b) a third beveled portion formed on said outer surface of said race member, said third beveled portion extending outwardly from said outer surface and abuttingly engaging said second beveled portion formed in said aperture, whereby said abutting engagement of said third beveled portion with said second beveled portion and further in combination with said locking member cages said race member within said aperture.

7. The male connection member, according to claim 6, wherein a material of said locking member is one of a metal, plastic, elastomer and various combinations thereof.

8. The male connection member, according to claim 7, wherein said material is metal.

9. The male connection member, according to claim 6, wherein said predetermined cross section of said locking member is substantially round.

10. The male connection member, according to claim 6, wherein said predetermined shape of said locking member is substantially round.

11. The male connection member, according to claim 10, wherein ends of said locking member form a predetermined gap in said substantially round shape.

12. The male connection member, according to claim 6, wherein said predetermined angle of said inner surface of said ledge portion is about 45 degrees.

13. The male connection member, according to claim 1, wherein said bearing assembly further includes a liner disposed intermediate said outer surface of said substantially spherical bearing member and said inner surface of said race member.

14. The male connection member, according to claim 1, wherein said second means for securing said bearing assembly to said second end portion of said male connection member includes:

(a) a second beveled portion formed in said aperture adjacent a second end thereof and extending outwardly from said aperture;

(b) a second groove disposed in said second end portion of said male connection member and formed by a combination of said second beveled portion formed in said aperture, an inwardly extending second recessed portion having a predetermined shape formed on said outer surface of said race member adjacent said second beveled portion formed in said aperture and an inner surface of a second ledge portion formed in said race member adjacent said second recessed portion, said second ledge portion at least partially closing said second recessed portion and said inner surface of said second ledge portion extends from said second recessed portion towards said aperture at a predetermined angle; and (c) a second locking member having a predetermined cross section and a predetermined shape and at least partially disposed within said second groove for caging said race member of said bearing assembly within said aperture and for preventing movement of said bearing assembly along said longitudinal axis of said aperture.

15. The male connection member, according to claim 1, wherein said second means for securing said bearing assembly to said second end portion of said male connection member includes:

(a) a second recessed portion formed in said aperture adjacent a second end thereof and extending outwardly from said aperture; and a second ledge portion formed on an outer surface of said race member and extending outwardly from said outer surface and abuttingly engaging said second recessed portion formed in said aperture, whereby said abutting engagement of said recessed portion with said second ledge portion and further in combination with said locking member cages said race member within said aperture.

16. A locking arrangement for securing a bearing assembly disposed within a male connection member for an articulated coupling apparatus for connecting together, in a substantially semi-permanent manner, adjacent ends of a pair of railway cars, said male connection member including a first end portion for attachment to a center sill member of a railway car and a second end portion formed integrally with said first end portion and axially extending therefrom, said second end portion having an aperture with a longitudinal axis disposed transverse to a longitudinal axis of said male connection member, said aperture having a bearing assembly disposed therein, said locking arrangement comprising:

(a) a first beveled portion formed in said aperture adjacent a first end thereof and extending outwardly from said aperture;

(b) a second beveled portion formed in said aperture adjacent a second end thereof and extending outwardly from said aperture;

(c) an outwardly extending beveled portion formed on one end of a race member of said bearing assembly, said outwardly extending beveled portion substantially abutting said first beveled portion formed in said aperture for preventing movement of said bearing assembly in one direction;

(d) a groove formed in said second end portion of said male connection member by a combination of a second beveled portion formed in said aperture, an inwardly extending recessed portion having a predetermined shape and formed on said outer surface of said race member adjacent said second beveled portion formed in said aperture and an inner surface of a ledge portion formed in said race member adjacent said recessed portion, said ledge portion at least partially closing said recessed portion and said inner surface extends from said recessed portion towards said aperture at a predetermined angle; and (e) a locking member having each of a predetermined cross section and predetermined shape and disposed within said groove for preventing movement of said bearing assembly in a second direction opposed to said first direction, said locking member in combination with said outwardly extending beveled portion formed in said race member of said bearing assembly caging said race member within said aperture.

17. A locking arrangement for securing a bearing assembly disposed within a male connection member for an articulated coupling apparatus for connecting together, in a substantially semi-permanent manner, adjacent ends of a pair of railway cars, said male connection member including a first end portion for attachment to a center sill member of a railway car and a second end portion formed integrally with said first end portion and axially extending therefrom, said second end portion having an aperture with a longitudinal axis disposed transverse to a longitudinal axis of said male connection member, said aperture having a bearing assembly disposed therein, said locking arrangement comprising:

(a) a first means formed within and engageable with one of said bearing assembly, said aperture and a combination thereof for removably securing said bearing assembly to said second end portion of said male connection member, said first means including:

(i) a beveled portion formed in said aperture adjacent a first end thereof and extending outwardly from said aperture, (ii) a groove formed in said second end portion of said male connection member by a combination of said beveled portion formed in said aperture, an inwardly extending recessed portion having a predetermined shape and formed on said outer surface of said race member adjacent said beveled portion formed in said aperture and an inner surface of a ledge portion formed in said race member adjacent said recessed portion, said ledge portion at least partially closing said recessed portion and said inner surface extends from said recessed portion towards said aperture at a predetermined angle, and (iii) a locking member having each of a predetermined cross section and predetermined shape and disposed within said groove for preventing movement of said bearing assembly in a first direction; and (b) a second means formed within and engageable with said one of said bearing assembly, said aperture and said combination thereof for removably securing said bearing assembly to said second end portion of said male connection member, whereby said second means in combination with said first means prevents movement of said bearing assembly in an opposed second direction and cages said race member within said aperture.

18. The locking arrangement, according to claim 17, wherein said second locking means includes:

(a) a second beveled portion formed in said aperture adjacent a second end thereof and extending outwardly from said aperture; and (b) a third beveled portion formed on an outer surface of a race member of said bearing assembly, said third beveled portion extending outwardly from said outer surface and abuttingly engaging said second beveled portion formed in said aperture.

19. The locking arrangement, according to claim 17, wherein said second locking means includes:

(a) second beveled portion formed in said aperture adjacent a second end thereof and extending outwardly from said aperture;

(b) a second groove disposed in said second end portion of said male connection member and formed by a combination of said second beveled portion formed in said aperture, an inwardly extending second recessed portion having a predetermined shape formed on an outer surface of a race member of said bearing assembly adjacent said second beveled portion formed in said aperture and an inner surface of a second ledge portion formed in said race member adjacent said second recessed portion, said second ledge portion at least partially closing said second recessed portion and said inner surface extends from said second recessed portion towards said aperture at a predetermined angle; and (c) a second locking member having a predetermined cross section and a predetermined shape and at least partially disposed within said second groove.

20. The locking arrangement, according to claim 17, wherein said second locking means includes:

(a) a second recessed portion formed in said aperture adjacent a second end thereof and extending outwardly from said aperture; and (b) a second ledge portion formed on an outer surface of a race member of said bearing assembly and extending outwardly from said outer surface and abuttingly engaging said second recessed portion formed in said aperture.

* * * * *